United States Patent
Priyantha et al.

(10) Patent No.: US 9,360,946 B2
(45) Date of Patent: Jun. 7, 2016

(54) HAND-WORN DEVICE FOR SURFACE GESTURE INPUT

(71) Applicant: Microsoft Technology Licensing, LLC, Redmond, WA (US)

(72) Inventors: Nissanka Arachchige Bodhi Priyantha, Redmond, WA (US); Jie Liu, Medina, WA (US); Jeremy Gummeson, Belchertown, MA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 14/987,526

(22) Filed: Jan. 4, 2016

(65) Prior Publication Data

US 2016/0116988 A1   Apr. 28, 2016

Related U.S. Application Data

(63) Continuation of application No. 14/273,238, filed on May 8, 2014, now Pat. No. 9,232,331.

(51) Int. Cl.
*G06F 3/01* (2006.01)
*G06F 3/16* (2006.01)
*H02J 7/02* (2016.01)

(52) U.S. Cl.
CPC ............... *G06F 3/017* (2013.01); *G06F 3/167* (2013.01); *H02J 7/025* (2013.01)

(58) Field of Classification Search
CPC .... H04R 29/00; H04R 1/1091; H04R 29/001; H04R 3/00; H04R 3/12; H04R 2420/07; H04R 27/00; H04R 2227/005
USPC .......................................................... 345/156
See application file for complete search history.

(56) References Cited

U.S. PATENT DOCUMENTS

2009/0295758 A1   12/2009   Lee et al.
2012/0038652 A1   2/2012   Yang
(Continued)

FOREIGN PATENT DOCUMENTS

EP   1785808 A1   5/2007
EP   2302882 A1   3/2011

OTHER PUBLICATIONS

Harrison, C. et al., "Skinput—Appropriating the Body as an Input Surface," In Proceedings of the SIGCHI conference on Human Factors in Computing Systems (CHI 2010), Apr. 10, 2010, Atlanta, Georgia, 10 Pages.
Zhang, B. et al., "A Ring-Shaped Interactive Device for Large Remote Display and Mobile Device Control," In Proceedings of the 13th International Conference on Ubiquitous Computing (UbiComp '11), Sep. 17, 2011, Beijing, China, 2 Pages.
ISA European Patent Office, International Search Report and Written Opinion Issued in Application No. PCT/JS2015/028682, Jul. 28, 2015, WIPO, 12 Pages.
United States Patent and Trademark Office, Notice of Allowance Issued in U.S. Appl. No. 14/273,238, Sep. 9, 2015, 8 Pages.

*Primary Examiner* — Mark Blouin
(74) *Attorney, Agent, or Firm* — Steve Wight; Sandy Swain; Micky Minhas (57) ABSTRACT

Embodiments that relate to energy efficient gesture input on a surface are disclosed. One disclosed embodiment provides a hand-worn device that may include a microphone configured to capture an audio input and generate an audio signal, an accelerometer configured to capture a motion input and generate an accelerometer signal, and a controller comprising a processor and memory. The controller may be configured to detect a wake-up motion input based on the accelerometer signal. The controller may wake from a low-power sleep mode in which the accelerometer is turned on and the microphone is turned off and enter a user interaction interpretation mode in which the microphone is turned on. Then, the controller may contemporaneously receive the audio signal and the accelerometer signal and decode strokes. Finally, the controller may detect a period of inactivity based on the audio signal and return to the low-power sleep mode.

20 Claims, 7 Drawing Sheets

(56) References Cited

U.S. PATENT DOCUMENTS

| | | |
|---|---|---|
| 2013/0022214 A1 | 1/2013 | Dickins et al. |
| 2013/0100044 A1 | 4/2013 | Zhao et al. |
| 2013/0135223 A1 | 5/2013 | Shai |
| 2013/0229508 A1 | 9/2013 | Li et al. |
| 2013/0285969 A1 | 10/2013 | Raffa et al. |
| 2014/0285416 A1 | 9/2014 | Priyantha et al. |
| 2015/0078586 A1* | 3/2015 | Ang .......... H03G 1/00 381/109 |

* cited by examiner

HAND-WORN DEVICE FOR SURFACE GESTURE INPUT

CROSS REFERENCE TO RELATED APPLICATIONS

The present application is a continuation of U.S. patent application Ser. No. 14/273,238, filed May 8, 2014, the entire contents of which are incorporated herein by reference for all purposes.

BACKGROUND

Gesture-based user interaction allows a user to control an electronic device by making gestures such as writing letters to spell words, swatting a hand to navigate a selector, or directing a remote controller to direct a character in a video game. One way to provide for such interaction is to use a device such as a mobile phone or tablet computing device equipped with a touch screen for two-dimensional (2-D) touch input on the touch screen. But, this can have the disadvantage that the screen is typically occluded while it is being touched, and such devices that include touch screens are also comparatively expensive and somewhat large in their form factors. Another way is to use depth cameras to track a user's movements and enable three-dimensional (3-D) gesture input to a system having an associated display, and such functionality has been provided in certain smart televisions and game consoles. One drawback with such three-dimensional gesture tracking devices is that they have high power requirements which presents challenges for implementation in portable computing devices, and another drawback is that they typically require a fixed camera to observe the scene, also a challenge to portability. For these reasons, there are challenges to adopting touch screens and 3-D gesture tracking technologies as input devices for computing devices with ultra-portable form factors, including wearable computing devices.

SUMMARY

Various embodiments are disclosed herein that relate to energy efficient gesture input on a surface. For example, one disclosed embodiment provides a hand-worn device that may include a microphone configured to capture an audio input and generate an audio signal, an accelerometer configured to capture a motion input and generate an accelerometer signal, and a controller comprising a processor and memory. The controller may be configured to detect a wake-up motion input based on the accelerometer signal. In response, the controller may wake from a low-power sleep mode in which the accelerometer is turned on and the microphone is turned off and enter a user interaction interpretation mode in which the microphone is turned on. Then, the controller may contemporaneously receive the audio signal and the accelerometer signal and decode strokes based on the audio signal and the accelerometer signal. Finally, the controller may detect a period of inactivity based on the audio signal and return to the low-power sleep mode.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
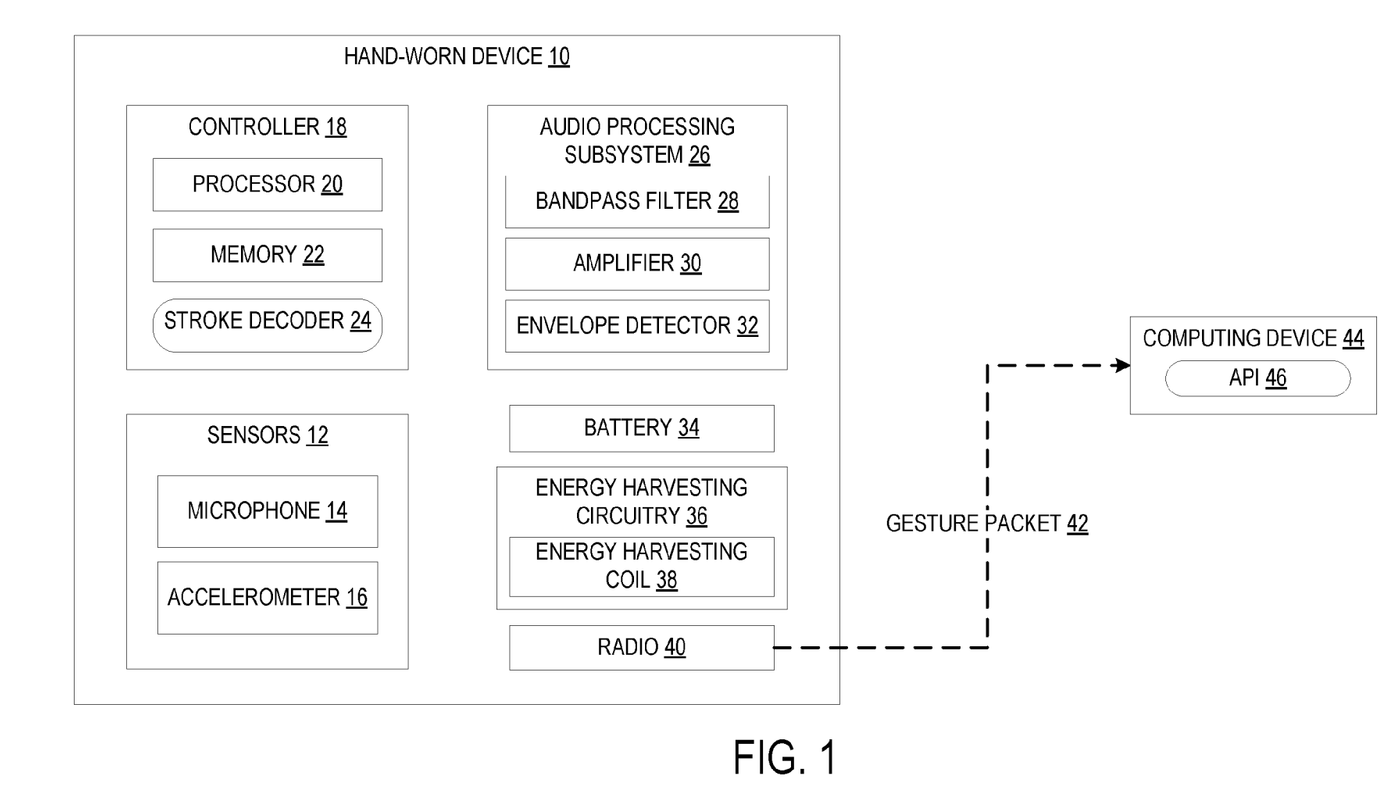
FIG. 1 is a schematic view of a hand-worn device for energy efficient gesture input on a surface, according to one embodiment.

FIG. 1 shows a schematic view of a hand-worn device 10 for energy efficient gesture input on a surface. The hand-worn device 10 may include sensors 12 which may include a microphone 14 configured to capture an audio input and generate an audio signal based thereon, and an accelerometer 16 configured to capture a motion input and generate an accelerometer signal based thereon. The hand-worn device may also include a controller 18 comprising a processor 20 and memory 22, and the controller 18 may be configured to switch the hand-worn device 10 between various operating modes to maintain energy efficiency.

When not in use, the hand-worn device 10 may operate in a low-power sleep mode in which the accelerometer 16 is turned on and the microphone 14 is turned off. The accelerometer 16 may itself operate in a low-power motion-detection mode, which may include only detecting motion input above a predetermined threshold. The controller 18 may then detect a wake-up motion input of a user based on the accelerometer signal from the accelerometer 16. The wake-up motion input may be from a wake-up gesture of the user such as a tap that exceeds a predetermined threshold in the accelerometer signal. Multiple taps or other suitable gestures may be used to prevent accidental waking by incidental user motions. Upon detecting the wake-up motion input, the controller 18 may wake from the low-power sleep mode and enter a user interaction interpretation mode in which the microphone 14 is turned on and the accelerometer 16 is fully active.

During the user interaction interpretation mode, the controller 18 may contemporaneously receive the audio signal from the microphone 14 and the accelerometer signal from the accelerometer 16. The controller 18 may then execute a stroke decoder 24 to decode strokes based on the audio signal and the accelerometer signal. Once the user has finished gesturing, the controller 18 may detect a period of inactivity based on the audio signal from the microphone 14 and return to the low-power sleep mode. The period of inactivity may be preset, such as 30 seconds, 1 minute, or 5 minutes, may be a user input period of time, or may be a period set through machine learning techniques that analyze patterns of accelerometer and audio signals and the periods of inactivity that are likely to follow.

Decoding strokes on the hand-worn device 10 may involve breaking gestures down into simple geometric patterns such as orthogonal or diagonal line segments and half circles. The strokes may make up letters or context-dependent symbols, etc. The stroke decoder 24 may comprise a stroke classifier which may be, for example, a support vector machine (SVM) classifier, and the SVM classifier may save energy by only looking for a predetermined set of strokes. Additionally, the stroke decoder 24 may be programmed to recognize taps and swipes based on a threshold of the accelerometer signal and a length of the audio signal. Further, orthogonal and diagonal scrolls are detectable, depending on the context of the gesture input, as explained below. Device 10 may be configured to recognize more complicated gestures as well, although recognition of more complicated gestures may require a concomitant increase in power consumed during disambiguation and/or degrade performance.

The hand-worn device 10 may include an audio processing subsystem 26 with a band-pass filter 28 configured to filter the audio signal, an amplifier 30 configured to amplify the audio signal, and an envelope detector 32 such as, for example, a threshold based envelope detector, configured to generate an audio envelope from the audio signal. Using these components, the audio processing subsystem 26 may transform the audio signal into an audio envelope by filtering the audio signal, amplifying the audio signal, and generating an audio envelope from the audio signal. The controller 18 may then decode strokes with the stroke decoder 24 based on the audio envelope of the audio signal, rather than the audio signal itself, and the accelerometer signal. The audio processing subsystem 26 may be formed separately from the microphone 14, or one or more parts within the audio processing subsystem 26 may be incorporated into the microphone 14, for example. Additionally, more than one band-pass filter 28 and more than one amplifier 30 may be included.

Gesture input may take place in many different situations with different surroundings, as well as on a variety of different types of surfaces. The audio input detected by the microphone 14 may be the sound of skin dragging across a surface, as one example. Sound may be produced in the same frequency band regardless of the composition of the surface, thus the surface may be composed of wood, plastic, paper, glass, cloth, skin, etc. As long as the surface generates enough friction when rubbed with skin to produce an audio input detectable by the microphone 14, virtually any sturdy surface material may be used. Additionally, any suitable surface that is close at hand may be used, such that it may not be necessary to gesture on only one specific surface, increasing the utility of the hand worn device 10 in a variety of environments.

The audio input, being thus produced by skin dragging across the surface, may be used to determine when the user is gesturing. However, the audio input may not always be easily distinguished from ambient noise. The audio processing subsystem 26 may filter the audio signal with at least one band-pass filter 28 to remove ambient noise and leave only the audio signal due to skin dragging across the surface. Generating an audio envelope of the audio signal may keep the length and amplitude of the audio signal for decoding strokes while discarding data that may not be used, both simplifying computation and saving the hand-worn device 10 energy.

The hand-worn device 10 may further comprise a battery 34 configured to store energy and energy harvesting circuitry 36 including an energy harvesting coil 38. The energy harvesting circuitry 36 may include a capacitor. The energy harvesting circuitry 36 may be configured to siphon energy from a device other than the hand-worn device via a wireless energy transfer technique such as near-field communication (NFC) or an inductive charging standard, and charge the battery with the siphoned energy. The energy may be siphoned from a mobile phone with NFC capabilities, for example. Simply holding the mobile phone may put the hand-worn device 10 in close proximity to an NFC chip in the mobile phone, allowing the hand-worn device 10 to charge the battery 34 throughout the day through natural actions of the user and without requiring removal of the hand-worn device 10.

In another example, the hand-worn device 10 may utilize a charging pad or other such charging device to charge the battery 34. If the user does not wish to wear the hand-worn device 10 at night, such a charging pad may be used by placing the hand-worn device 10 on it while the user sleeps, for example. However, removal may not be necessary. For instance, the charging pad may be placed under a mouse or other such input device while the user operates a personal computer, allowing the hand-worn device 10 to be charged while the user works.

The hand-worn device 10 may further comprise a radio 40 and the controller 18 may be configured to send a gesture packet 42 to a computing device 44 via the radio 40. Typically the radio includes a wireless transceiver configured for two way communication, which enables acknowledgments of transmissions to be sent from the computing device back to the hand worn device. In other embodiments, a radio 40 including a one way transmitter may be used. The computing device may be the device from which the hand-worn device siphons energy, but energy may also be siphoned from a separate device. The gesture packet 42 may comprise the decoded strokes and inter-stroke information. The inter-stroke information may comprise inter-stroke duration, which is the time between decoded strokes, and data indicating whether a user remains in contact with the surface or does not remain in contact with the surface between decoded strokes. These two factors may be taken into account when assembling the decoded strokes into different letters, for example. One letter may be gestured with two consecutive strokes without lifting, and one may be gestured with the same two stokes, but the user may lift off the surface and reposition for the second stroke.

The computing device may comprise an application programming interface (API) 46 configured to receive the gesture packet 42 and decode an application input corresponding to the gesture packet 42. Sending a gesture packet 42 rather than raw signals may greatly reduce the amount of energy the hand-worn device 10 may spend, since the gesture packet 42 may be much smaller than the corresponding audio signal and accelerometer signal.

The application input may be letters, symbols, or commands, for example. Commands may include scrolling, changing pages, zooming in or out, cycling through displayed media, selecting, changing channels, and adjusting volume, among others. The API 46 may provide context to the stroke decoder 24 such that the stroke decoder 24 may only recognize, for example, strokes of letters for text entry or scrolls for scrolling through displayed pages. Such gestures may be difficult to disambiguate without context from the API 46.

The computing device 44 may be any of a wide variety of devices for different uses. For example, the computing device 44 may be a device that controls a television. The hand-worn device 10 may receive gesture input that corresponds to application input to change the channel on the television or adjust the volume. In this case, the surface may be a couch arm or the user's own leg. In another example, the computing device 44 may control a television and allow a user to stream movies. In this case, the hand-worn device 10 may receive a swipe or scroll application input to browse through movies, or it may allow the user to input letters to search by title, etc. In another example, the computing device 44 may control display of a presentation. The user may control slides without holding onto a remote which is easily dropped.

In another example, the computing device 44 may allow a user to access a plurality of devices. In such a situation, the user may be able to, for example, turn on various appliances in a home, by using one hand-worn device 10. Alternatively, the user may be able to switch between devices that share a common display, for example. In yet another example, the computing device 44 may control a head-mounted display (HMD) or be a watch or mobile phone, where space for input on a built-in surface is limited. For instance, if the computing device 44 is a mobile phone, it may ring at an inopportune time for the user. The user may frantically search through pockets and bags to find the mobile phone and silence the ringer. However, by using the hand-worn device 10, the user may easily interact with the mobile phone from a distance. In such instances, the hand-worn device 10 may be constantly available due to being worn by the user.

Figure 2:
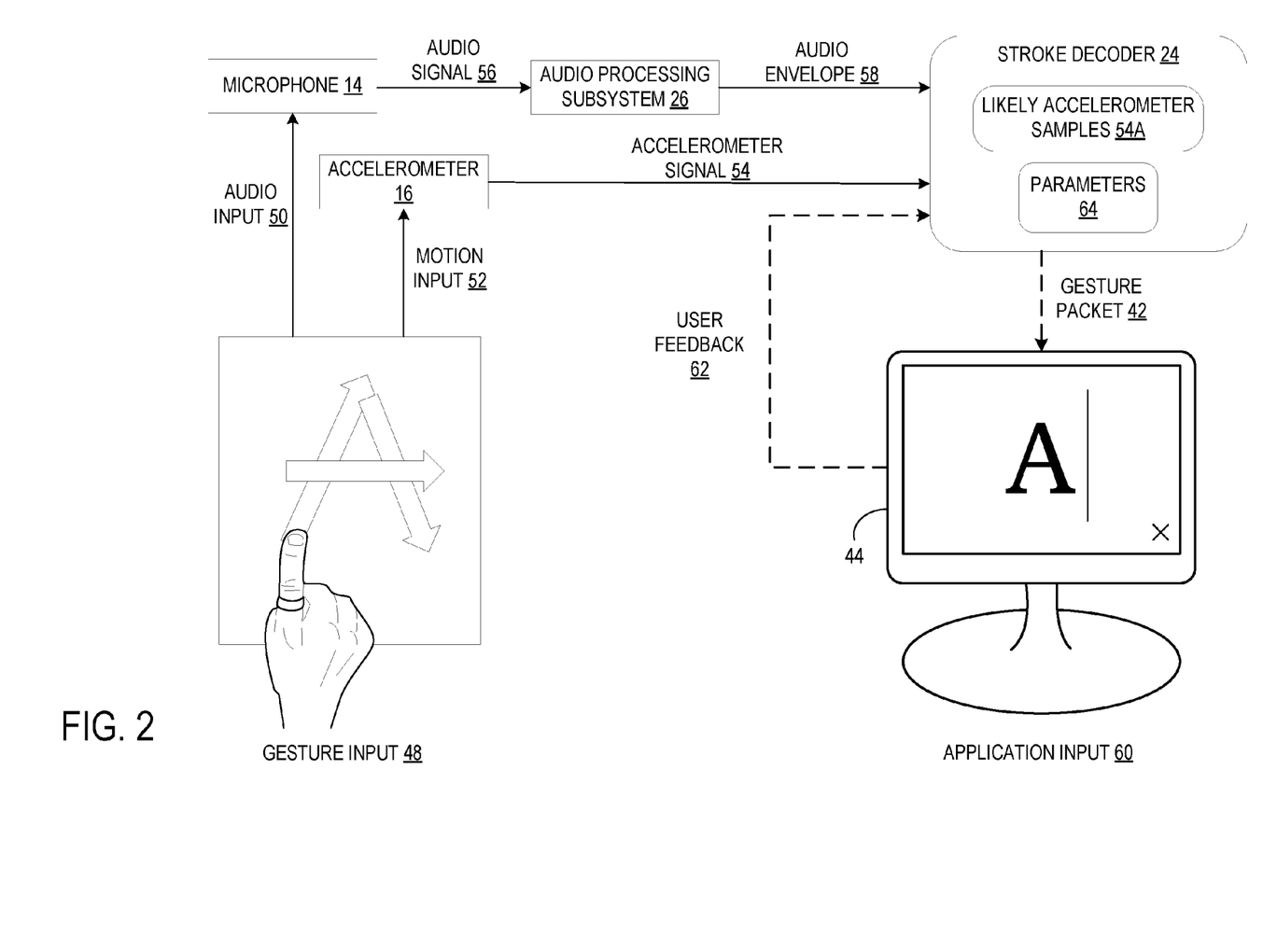
FIG. 2 illustrates an example use of the hand-worn device of FIG. 1 to input a gesture on the surface.

FIG. 2 illustrates an example use of the hand-worn device 10 to input a gesture on the surface, utilizing the hardware and software components of FIG. 1. In this example, the hand-worn device 10 is a ring, which may be the size and shape of a typical ring worn as jewelry. However, other manifestations may be possible, such as a watch, wristband, fingerless glove, or other hand-worn device. In this instance, the user is gesturing the letter "A" with his finger on a table, providing a gesture input 48. However, in an instance where the user does not have a finger or otherwise cannot gesture with a finger, another digit or an appendage, for example, may serve to enact the gesture. In order for the microphone 14 to capture an audio input 50, skin is typically dragged across a surface, and in order for the accelerometer 16 to capture a motion input 52, the accelerometer 16 is typically placed near enough to where the user touches the surface to provide a useable accelerometer signal 54.

To account for different users, surfaces, and situations, the accelerometer 16 may be further configured to determine a tilt of the hand-worn device 10 after detecting the wake-up motion input. A given surface may not be perfectly horizontal, or the user may slightly tilt her finger, for example. Tilt determination may be used to convert X-, Y-, and Z-components of the accelerometer signal 54 to X-, Y-, and Z-components with respect to an interacting plane of the surface.

As mentioned above, the microphone 14 may generate the audio signal 56, which may then be received by the audio processing subsystem 26 to generate the audio envelope 58. The audio envelope 58 may be received by the stroke decoder 24 of the controller 18, along with the accelerometer signal 54. The stroke decoder 24 may decode strokes based on the audio envelope 58 and the accelerometer signal 54 and generate a gesture packet 42. The gesture packet 42 may be sent to the computing device 44, in this case a personal computer, where the API 46 may decode an application input 60 corresponding to the gesture packet 42. In this example, the application input 60 includes displaying the letter "A."

The controller 18 may be further configured to receive feedback 62 from the user indicating that the application input 60 is correct or incorrect. In this example, the feedback 62 is received by selecting or not selecting the cancel option X displayed by the computing device 44. In other examples, the feedback 62 may be received by the hand-worn device 10 by shaking the hand-worn device 10, etc., to cancel the recognition phase and start gesture input again or to select a different recognition candidate. Based on this feedback 62, the controller 18 may apply a machine learning algorithm to accelerometer samples of the accelerometer signal 54 to statistically identify accelerometer samples 54A that are likely to be included in the decoded strokes, and eliminate other accelerometer samples that are unlikely to be included. More generally, based on the feedback 62, the controller 18 may adjust parameters 64 of the stroke decoder 24.

In this way, the stroke decoder 24 may use only the most relevant accelerometer samples 54A along with the audio envelope 58 when decoding strokes. This may allow the stroke decoder 24 to use simple arithmetic operations for low-power stroke classification and avoid using techniques such as dynamic time warping and cross correlations that may use complex mathematical operations and/or a greater number of accelerometer samples, which may lead to a higher energy consumption. Instead, the hand-worn device 10 may be further configured to consume no more than 1.5 mA and preferably no more than 1.2 mA in the user interaction interpretation mode and no more than 1.0 µA and preferably no more than 0.8 µA in the low-power sleep mode.

Figure 3:
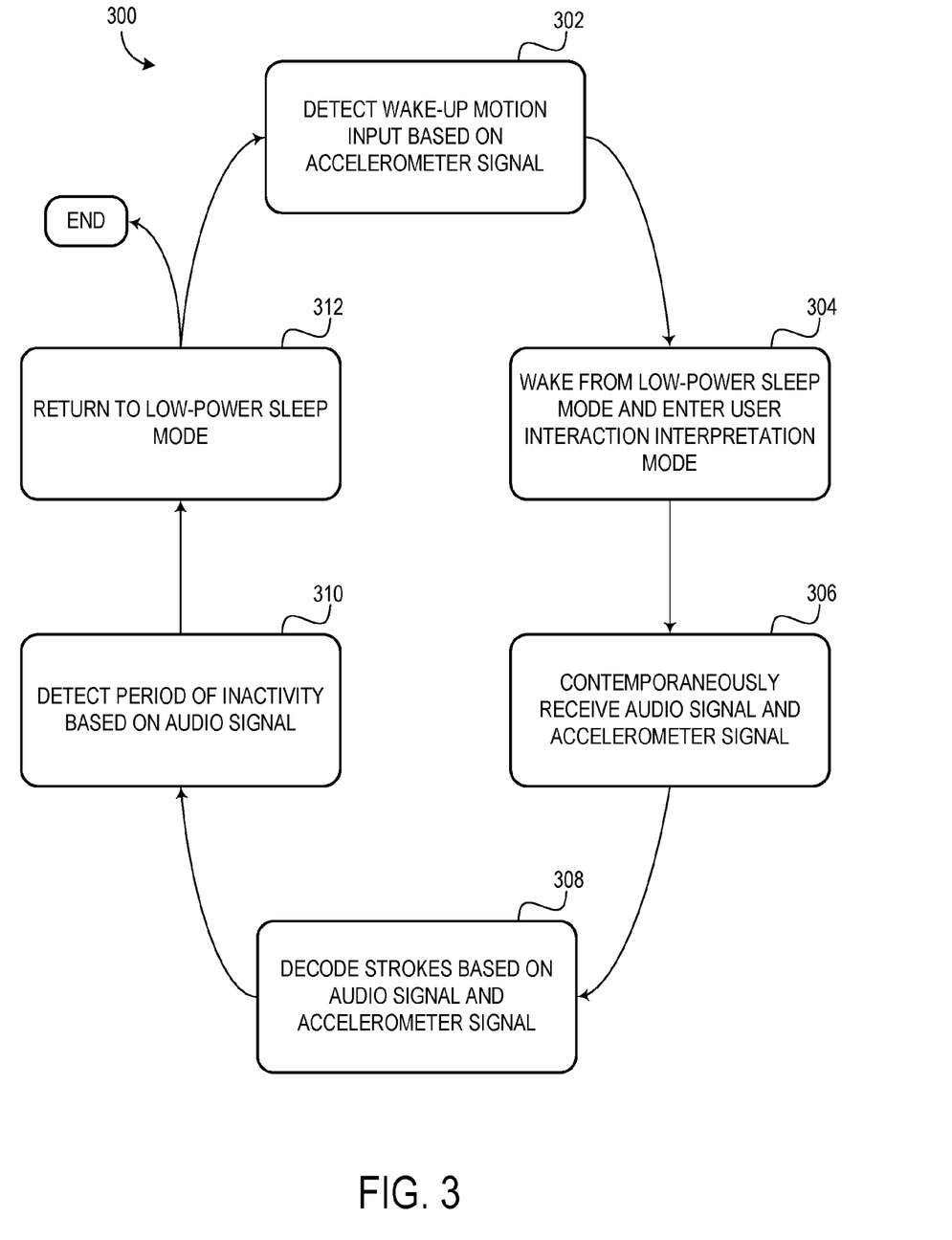
FIG. 3 is a flowchart illustrating an energy efficient method for capturing gesture input on a surface, according to one embodiment.

FIG. 3 illustrates a flowchart of an energy efficient method, method 300, for capturing gesture input on a surface with a hand-worn device. The hand-worn device may be a ring, watch, wristband, glove, or other hand-worn device, for example. The following description of method 300 is provided with reference to the software and hardware components of the hand-worn device 10 and computing device 44 described above and shown in FIGS. 1 and 2. It will be appreciated that method 300 may also be performed in other contexts using other suitable hardware and software components.

With reference to FIG. 3, at 302 the method 300 may include detecting a wake-up motion input based on an accelerometer signal from an accelerometer. At 304 the method 300 may include waking from a low-power sleep mode in which the accelerometer is turned on and a microphone is turned off and entering a user interaction interpretation mode in which the microphone is turned on. In addition, after detecting the wake up motion input, the hand worn device may be configured to begin detecting a tilt of the hand worn device at the accelerometer.

At 306 the method 300 may include contemporaneously receiving an audio signal from the microphone and the accelerometer signal. At 308 the method 300 may include decoding strokes based on the audio signal and the accelerometer signal. At 310 the method 300 may include detecting a period of inactivity based on the audio signal, which may be of the length described above, input by a user, or learned over time by the hand worn device. At 312 the method 300 may include returning to the low-power sleep mode. After 312 the method 300 may include ending or continuing to operate in a sleep-wake cycle by returning to 302.

It will be appreciated as described above that the hand-worn device may further comprise a battery and energy harvesting circuitry including an energy harvesting coil, and thus at any point throughout method 300, the method may include siphoning energy from a device other than the hand-worn device via a wireless energy transfer technique such as near-field communication (NFC) at the energy harvesting circuitry and charging the battery with the siphoned energy. The energy may be siphoned from a device such as an NFC capable smartphone or charging pad, for example. Combining the low power consumption of the device with energy siphoning abilities may allow the user to wear the hand-worn device at all times without removing it for charging. This may reduce the likelihood of dropping, losing, or forgetting the hand-worn device, incorporating the use and presence of the hand-worn device into daily life.

Figure 4:
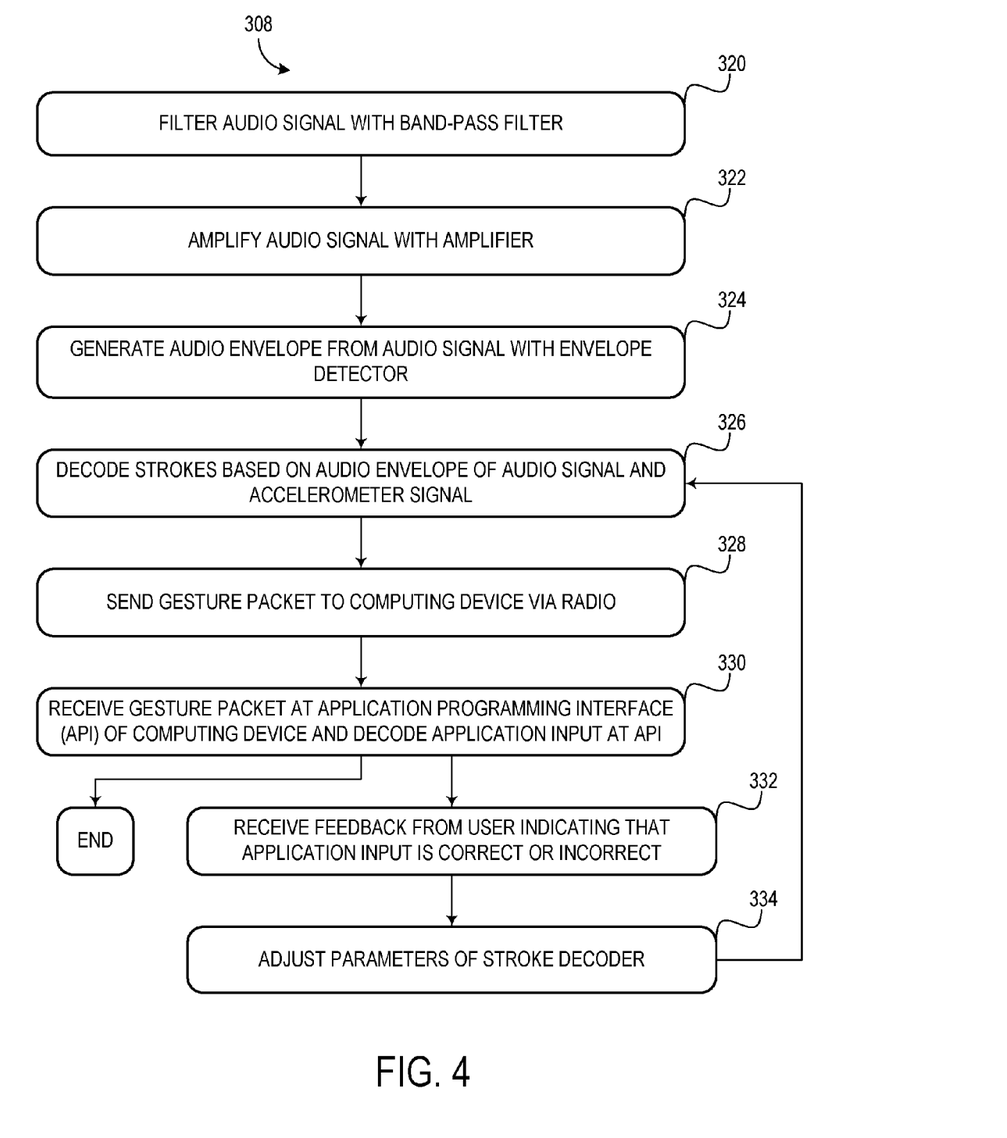
FIG. 4 is a flowchart illustrating substeps of a step of the method of FIG. 3 for decoding strokes.

FIG. 4 is a flowchart illustrating detailed substeps of step 308, decoding strokes, of method 300 of FIG. 3. At 320 the method 300 may include filtering the audio signal with a band-pass filter of an audio processing subsystem of the hand-worn device. The audio processing subsystem may further comprise at least one amplifier and an envelope detector. At 322 the method 300 may include amplifying the audio signal with the amplifier. At 324 the method 300 may include generating an audio envelope from the audio signal with an envelope detector. At 326 the method 300 may include decoding strokes based on the audio envelope of the audio signal and the accelerometer signal.

At 328 the method 300 may include sending a gesture packet to a computing device via a radio, the gesture packet comprising the decoded strokes and inter-stroke information. The inter-stroke information may comprise inter-stroke duration and data indicating whether a user remains in contact with the surface or does not remain in contact with the surface between decoded strokes. At 330 the method 300 may include receiving the gesture packet at an application programming interface (API) of the computing device and decoding an application input corresponding to the gesture packet at the API. After 330, the step 308 of method 300 may end. However, it may also proceed to 332 to begin a feedback process.

At 332 the method 300 may include receiving feedback from the user indicating that the application input is correct or incorrect. At 334 the method 300 may include, based on the feedback, adjusting parameters of a stroke decoder. After 336, the method 300 may include returning to 326 decode strokes more efficiently than before receiving feedback.

It will be appreciated that method 300 is provided by way of example and is not meant to be limiting. Therefore, it is to be understood that method 300 may include additional and/or alternative steps than those illustrated in FIGS. 3 and 4. Further, it is to be understood that method 300 may be performed in any suitable order. Further still, it is to be understood that one or more steps may be omitted from method 300 without departing from the scope of this disclosure.

Figure 5:
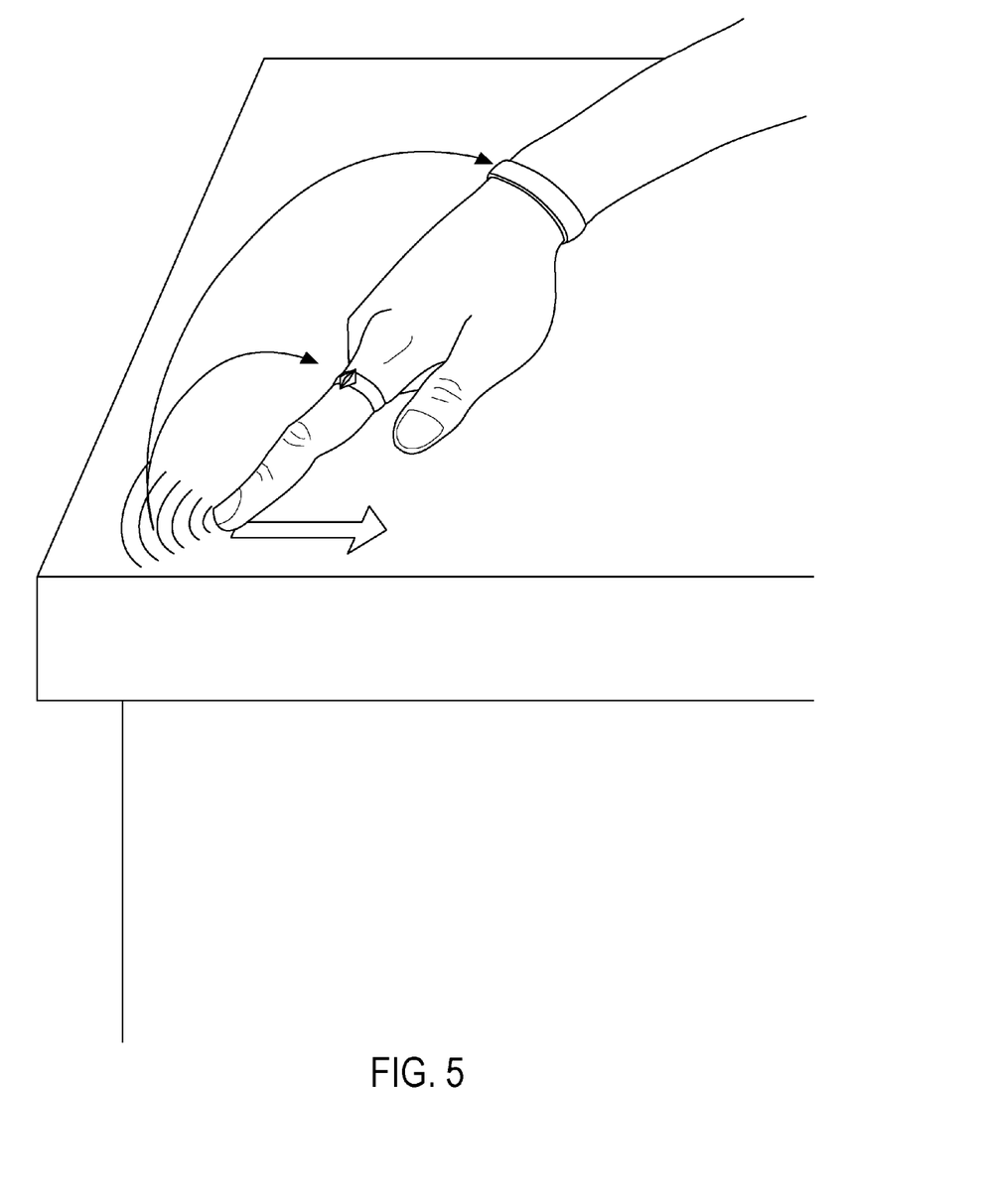
FIG. 5 illustrates an example use of embodiments of the hand-worn device as a ring or wristband.

FIG. 5 illustrates example embodiments of the hand-worn device as a ring or wristband, though it may also be another hand-worn device such as a fingerless glove, for example. The user may wear the ring on a finger or the wristband on a wrist. The surface upon which the user is gesturing is a countertop in this example. The wide arrow indicates the movement of the user dragging her finger along the countertop to provide a gesture input, and her entire hand, including the hand-worn device, may move in nearly or exactly the same manner as her finger, such that the accelerometer in the hand-worn device may generate an accelerometer signal with accuracy. The friction generated between the countertop and the user's finger may produce sound waves as visually represented in FIG. 5. The sound waves may serve as an audio input and the thin arrows may demonstrate the microphone in the hand-worn device capturing the audio input.

Figure 7:
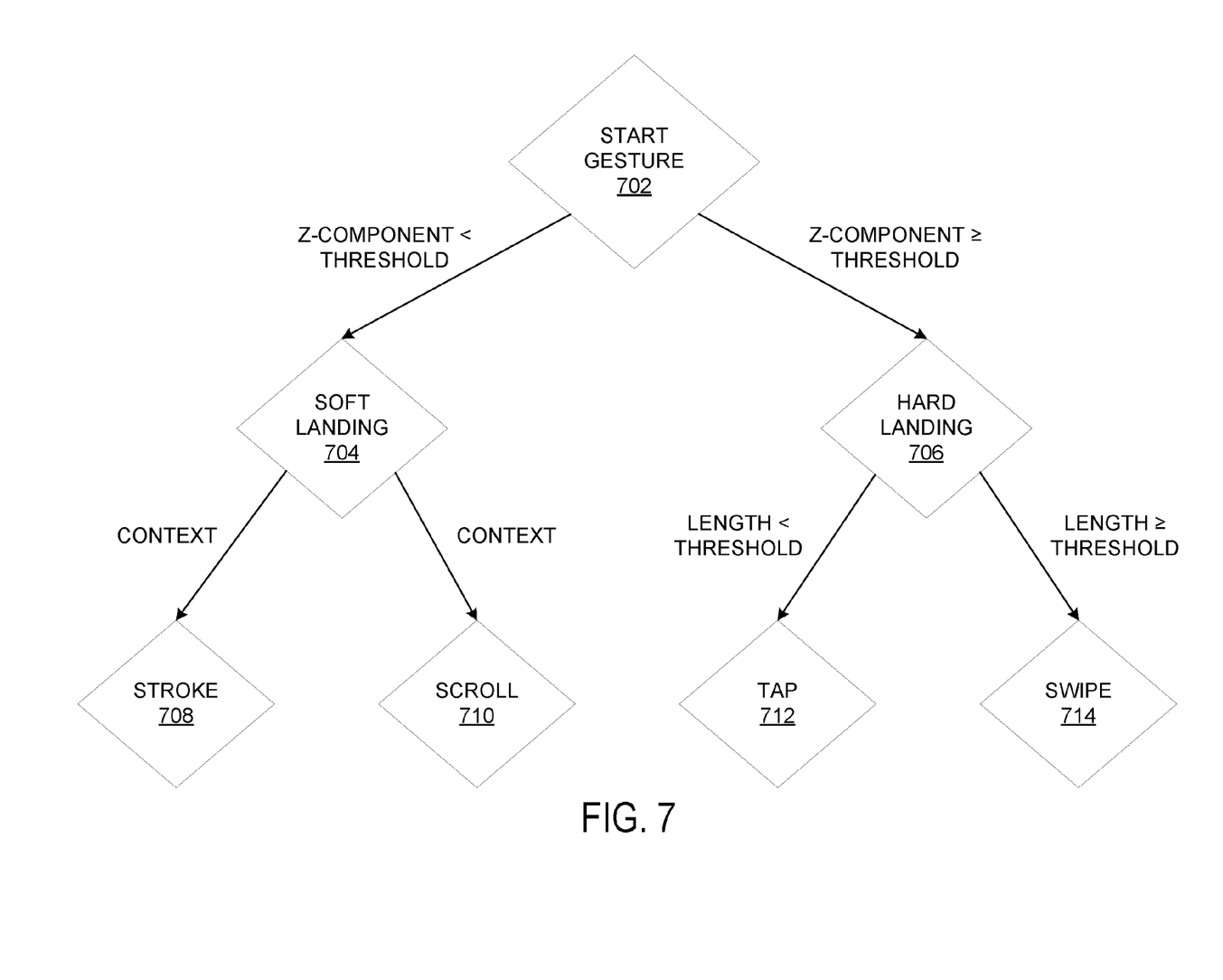
FIG. 7 illustrates a hierarchical gesture classification strategy for disambiguating different gestures.

FIG. 7 illustrates a hierarchical gesture classification strategy for disambiguating different gestures. Disambiguating gestures in tiers in this manner may allow for higher accuracy in detecting and interpreting gestures as well as reduced energy consumption. At each tier, disambiguation is performed to eliminate gesture candidates, and narrow the field of possible matching gestures. By utilizing a gesture recognition algorithm that traverses a disambiguation tree in this manner, the total processing power consumed for matching a gesture may be reduced, since possible candidates are eliminated at each fork in the hierarchy. As described above, not only may gestures be broken down into strokes and reassembled as letters, characters, shapes, symbols, etc., but gestures such as scrolls, swipes, and taps may also be decoded with different classifiers.

With reference to FIG. 7, at 702 the start of a gesture may be detected by the audio envelope indicating that skin is moving across a surface. From here, the magnitude of the Z-component of the accelerometer signal may be compared to a threshold value to classify the gesture as either a hard landing or a soft landing. At 704 a soft landing may be determined if the Z-component is under the threshold. Alternatively, at 706 a hard landing may be determined if the Z-component is equal to or over the threshold. The types of landing may be classified by a landing classifier of the stroke decoder.

Context from the API may be used to further classify the gesture with a soft landing into either a stroke or series of strokes at X08 or a scroll at X10. The context may be, for example, that the API will accept text input (stroke), invoking the stroke classifier of the stroke decoder, or page navigation (scroll), invoking a scroll classifier of the stroke decoder. Any or all of the landing classifier, the stroke classifier, and the scroll classifier may be an SVM classifier, for example. If the gesture is determined to be a scroll, the beginning of the gesture may be a short nudge. After the nudge is detected, the remainder of the gesture may be interpreted in real-time such that different directions of scrolling are determined based upon the accelerometer signal.

A gesture with a hard landing may be further disambiguated by a swipe-tap classifier using the length of the audio envelope. At 712 a tap may be determined by a very short audio envelope, i.e. it is under a threshold. At 714 a swipe may be determined by a longer audio envelope, i.e. it is greater than or equal to the threshold. A swipe may be further disambiguated by direction according to the accelerometer signal. In this manner, a variety of gesture inputs may be disambiguated by traversing a tiered classifier as shown in FIG. 7, thus conserving processor time and power consumption as compared to attempting to disambiguate a wide class of gestures in a single step.

The above described systems and methods may be used to provide energy efficient gesture input on a surface using a hand-worn device. The hand-worn device may be adapted in different embodiments to serve a variety of purposes. This approach has the potential advantages of constant availability, low power consumption, battery charging with or without removing the hand-worn device, accurate capture of user intent, and versatility.

In some embodiments, the methods and processes described herein may be tied to a computing system of one or more computing devices or hand-worn devices. In particular, such methods and processes may be implemented as a computer-application program or service, an application-programming interface (API), a library, and/or other computer-program product.

Figure 6:
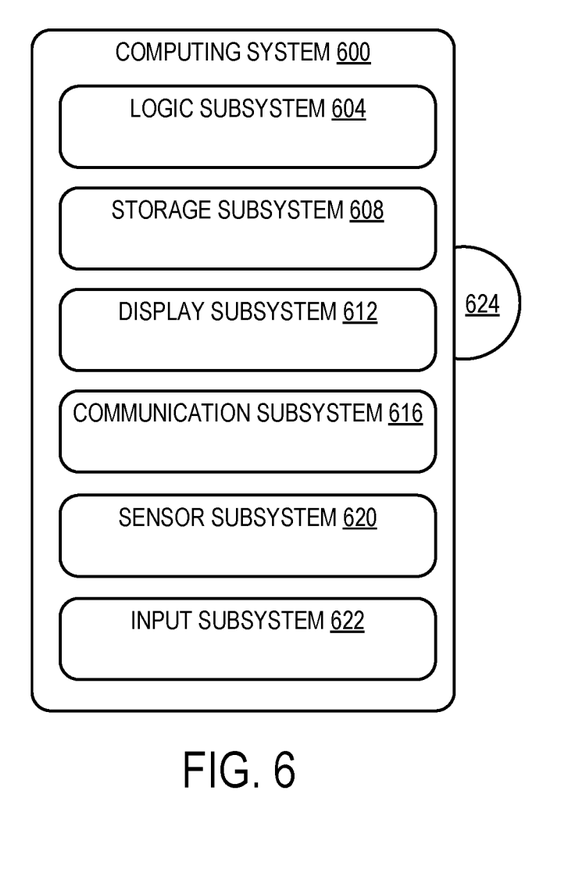
FIG. 6 is a simplified schematic illustration of an embodiment of a computing system within which the hand worn device of FIG. 1 may be utilized.

FIG. 6 schematically shows a non-limiting embodiment of a computing system 600 that can enact one or more of the methods and processes described above. Hand-worn device 10 and computing device 44 may take the form of computing system 600. Computing system 600 is shown in simplified form. Computing system 600 may take the form of one or more personal computers, server computers, tablet computers, home-entertainment computers, network computing devices, gaming devices, mobile computing devices, mobile communication devices (e.g., smartphone), hand-worn devices, and/or other computing devices.

Computing system 600 includes a logic subsystem 604 and a storage subsystem 608. Computing system 600 may optionally include a display subsystem 612, sensor subsystem 620, input subsystem 622, communication subsystem 616, and/or other components not shown in FIG. 6.

Logic subsystem 604 includes one or more physical devices configured to execute instructions. For example, the logic subsystem may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic subsystem may include one or more processors configured to execute software instructions. Additionally or alternatively, the logic subsystem may include one or more hardware or firmware logic subsystems configured to execute hardware or firmware instructions. Processors of the logic subsystem may be single-core or multi-core, and the instructions executed thereon may be configured for sequential, parallel, and/or distributed processing. Individual components of the logic subsystem optionally may be distributed among two or more separate devices, which may be remotely located and/or configured for coordinated processing. Aspects of the logic subsystem may be virtualized and executed by remotely accessible, networked computing devices configured in a cloud-computing configuration.

Storage subsystem 608 includes one or more physical devices configured to hold instructions executable by the logic subsystem to implement the methods and processes described herein. When such methods and processes are implemented, the state of storage subsystem 608 may be transformed—e.g., to hold different data.

Storage subsystem 608 may include removable devices 624 and/or built-in devices. Storage subsystem 608 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage subsystem 608 may include volatile, nonvolatile, dynamic, static, read/write, read-only, random-access, sequential-access, location-addressable, file-addressable, and/or content-addressable devices.

It will be appreciated that storage subsystem 608 includes one or more physical devices. However, aspects of the instructions described herein alternatively may be propagated by a communication medium (e.g., an electromagnetic signal, an optical signal, etc.) that is not held by a physical device for a finite duration.

Aspects of logic subsystem 604 and storage subsystem 608 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module" and "program" may be used to describe an aspect of computing system 600 implemented to perform a particular function. In some cases, a module or program may be instantiated via logic subsystem 604 executing instructions held by storage subsystem 608. It will be understood that different modules, programs, and/or subsystems may be instantiated from the same application, service, code block, object, library, routine, API, function, etc. Likewise, the same module, program, and/or subsystem may be instantiated by different applications, services, code blocks, objects, routines, APIs, functions, etc. The terms "module" and "program" may encompass individual or groups of executable files, data files, libraries, drivers, scripts, database records, etc.

When included, display subsystem 612 may be used to present a visual representation of data held by storage subsystem 608. This visual representation may take the form of a graphical user interface (GUI). As the herein described methods and processes change the data held by the storage subsystem, and thus transform the state of the storage subsystem, the state of display subsystem 612 may likewise be transformed to visually represent changes in the underlying data. Display subsystem 612 may include one or more display devices utilizing virtually any type of technology. Such display devices may be combined with logic subsystem 604 and/or storage subsystem 608 in a shared enclosure, or such display devices may be peripheral display devices.

When included, communication subsystem 616 may be configured to communicatively couple computing system 600 with one or more other computing devices. Communication subsystem 616 may include wired and/or wireless communication devices compatible with one or more different communication protocols. As non-limiting examples, the communication subsystem may be configured for communication via a radio, a wireless telephone network, or a wired or wireless local- or wide-area network. In some embodiments, the communication subsystem may allow computing system 600 to send and/or receive messages to and/or from other devices via a network such as the Internet.

When included, sensor subsystem 620 may include one or more sensors configured to sense different physical phenomena (e.g., visible light, infrared light, sound, acceleration, orientation, position, etc.). Sensor subsystem 620 may be configured to provide sensor data to logic subsystem 604, for example.

When included, input subsystem 622 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity. It will be appreciated that computing system 600 may function as computing device 44 describe above and shown in FIGS. 1 and 2, and the hand-worn device 10 may be an input device of input subsystem 622.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A hand-worn device for gesture input on surfaces, comprising:
   a microphone configured to capture an audio input and generate an audio signal;
   an accelerometer configured to capture a motion input and generate an accelerometer signal;
   a radio configured to send data to a computing device; and
   a controller comprising a processor and memory;
   wherein the controller is configured to:
     receive the audio signal and the accelerometer signal;
     decode strokes based on the audio signal and the accelerometer signal; and send a gesture packet to a computing device via a radio, the gesture packet comprising the decoded strokes and inter-stroke information for the computing device to interpret multi-stroke gestures.

2. The hand-worn device of claim 1, further comprising an audio processing subsystem, comprising:
   a band-pass filter configured to filter the audio signal;
   an amplifier configured to amplify the audio signal; and
   an envelope detector configured to generate an audio envelope from the audio signal;
   wherein the audio processing subsystem is configured to transform the audio signal into an audio envelope by filtering the audio signal, amplifying the audio signal, and generating an audio envelope from the audio signal; and
   wherein the controller is configured to decode the strokes based on the audio envelope of the audio signal and the accelerometer signal.

3. The hand-worn device of claim 1, wherein the inter-stroke information comprises inter-stroke duration and data indicating whether a user remains in contact with the surface or does not remain in contact with the surface between decoded strokes.

4. The hand-worn device of claim 1, wherein the computing device comprises an application programming interface (API) configured to receive the gesture packet and decode an application input corresponding to the gesture packet.

5. The hand-worn device of claim 4, wherein the controller is further configured to receive feedback from the user indicating that the application input is correct or incorrect, and based thereon, adjust parameters of a stroke decoder.

6. The hand-worn device of claim 1, further comprising:
   a battery configured to store energy; and
   energy harvesting circuitry including an energy harvesting coil, configured to siphon energy from a device other than the hand-worn device via a wireless energy transfer technique;
   wherein the energy harvesting circuitry is configured to charge the battery with the siphoned energy.

7. The hand-worn device of claim 1, wherein the hand-worn device is a ring.

8. The hand-worn device of claim 1, wherein the accelerometer is further configured to determine a tilt of the hand-worn device.

9. The hand-worn device of claim 1, wherein the controller is further configured to:
   assemble the decoded strokes and the inter-stroke information of the gesture into a letter, a symbol, or a command.

10. In a hand-worn device, a method for capturing gesture input on surfaces, comprising:
    receiving an audio signal from a microphone and an accelerometer signal from an accelerometer;
    decoding strokes based on the audio signal and the accelerometer signal; and
    sending a gesture packet to a computing device via a radio, the gesture packet comprising the decoded strokes and inter-stroke information, for the computing device to interpret multi-stroke gestures.

11. The method of claim 10, further comprising:
    filtering the audio signal with a band-pass filter of an audio processing subsystem;
    amplifying the audio signal with an amplifier of the audio processing subsystem;
    generating an audio envelope from the audio signal with an envelope detector of the audio processing subsystem; and
    decoding strokes based on the audio envelope of the audio signal and the accelerometer signal.

12. The method of claim 10, wherein the inter-stroke information comprises inter-stroke duration and data indicating whether a user remains in contact with the surface or does not remain in contact with the surface between decoded strokes.

13. The method of claim 10, further comprising receiving the gesture packet at an application programming interface (API) of the computing device and decoding an application input corresponding to the gesture packet at the API.

14. The method of claim 13, wherein decoding the application input comprises:
    detecting a start of a gesture;
    interpreting the direction, duration, and acceleration of the gesture;
    determining whether the gesture has a hard landing or a soft landing based on the accelerometer signal;
    classifying the gesture as one of a stroke, a series of strokes, a scroll, a tap, and a swipe based on the accelerometer signal, the audio signal, and context from the API; and
    classifying the gesture as one of a letter, a symbol, and a command based on the context.

15. The method of claim 14, further comprising:
    assembling the decoded strokes and the inter-stroke information of the gesture into the letter, the symbol, or the command based on the interpreted direction, duration, and acceleration of the gesture and the context.

16. The method of claim 13, further comprising:
    receiving feedback from the user indicating that the application input is correct or incorrect;
    based thereon, adjusting parameters of a stroke decoder.

17. The method of claim 10, wherein the hand-worn device further comprises a battery and energy harvesting circuitry including an energy harvesting coil, the method further comprising:
    siphoning energy from a device other than the hand-worn device via a wireless energy transfer technique at the energy harvesting circuitry; and
    charging the battery with the siphoned energy.

18. The method of claim 10, wherein the hand-worn device is a ring.

19. The method of claim 10,
    wherein the decoded strokes comprise at least one of orthogonal line segments, diagonal line segments, and half circles.

20. A hand-worn device for gesture input on surfaces, wherein the hand-worn device is a ring, comprising:
    a microphone configured to capture an audio input and generate an audio signal;
    an accelerometer configured to capture a motion input and generate an accelerometer signal;

a controller comprising a processor and memory;
an audio processing subsystem, comprising:
   a band-pass filter configured to filter the audio signal;
   an amplifier configured to amplify the audio signal; and
   an envelope detector configured to generate an audio envelope from the audio signal; and
a radio;
wherein the controller is configured to:
   receive the audio signal and the accelerometer signal;
   receive the audio envelope from the audio processing subsystem;
   decode strokes based on the audio envelope of the audio signal and the accelerometer signal; and
   send a gesture packet to a computing device via the radio, the gesture packet comprising the decoded strokes and inter-stroke information.

\* \* \* \* \*